United States Patent [19]

Bernhard et al.

[11] 4,151,970

[45] May 1, 1979

[54] MOUNTING OF TUBULAR TURBINES

[75] Inventors: Emmerich Bernhard; Eduard Walzel, both of Graz, Austria

[73] Assignee: Escher Wyss Aktiengesellschaft, Switzerland

[21] Appl. No.: 681,731

[22] Filed: Apr. 29, 1976

Related U.S. Application Data

[63] Continuation-in-part of Ser. No. 475,024, May 31, 1974, abandoned.

[51] Int. Cl.$^2$ .............................................. F16M 13/00
[52] U.S. Cl. .................................. 248/637; 415/219 R
[58] Field of Search ............. 403/121; 415/110, 219 R, 415/500; 248/2, 26

[56] References Cited

U.S. PATENT DOCUMENTS

| | | | |
|---|---|---|---|
| 1,757,839 | 5/1930 | Keck | 403/121 |
| 1,764,761 | 6/1930 | Spreen | 248/26 |
| 1,778,902 | 10/1930 | Lempges | 403/121 X |
| 1,860,883 | 5/1932 | Bilde | 248/26 |
| 2,103,154 | 12/1937 | Faber | 248/26 |
| 3,353,028 | 11/1967 | Braikevitch et al. | 415/500 |
| 3,752,427 | 8/1973 | Bellati | 415/219 R |

FOREIGN PATENT DOCUMENTS 1910381 10/1969 Fed. Rep. of Germany ........... 415/110

*Primary Examiner*—William H. Schultz
*Attorney, Agent, or Firm*—James E. Bryan

[57] ABSTRACT

This invention relates to a mounting structure for a tubular turbine having a horizontal or slightly inclined machine axis, particularly a Kaplan-type tubular turbine, and whose supporting forces act at a right angle to the duct wall of said turbine, on one hand, and parallel to said duct wall, on the other hand, and are absorbed by supporting plates equipped with foundation anchors in said duct wall, comprising a knife-edge suspension means connected to said turbine housing and in engagement with one of said supporting plates, and adapted to lead that portion of said supporting forces acting at a right angle to said duct wall into a foundation, and elastic member means connected to said supporting plate and to a support for said suspension means, and adapted to absorb that portion of said supporting forces acting parallel to said duct wall.

5 Claims, 4 Drawing Figures

MOUNTING OF TUBULAR TURBINES

This application is a continuation-in-part of U.S. patent application Ser. No. 475,024, filed May 31, 1974, now abandoned.

The invention relates to an arrangement for supporting tubular turbines with horizontal or only slightly inclined axes, especially Kaplan tubular turbines, in which the supporting forces act both normally and parallel to the duct wall.

Tubular turbines of this known kind generally are centrally located in the water-transmitting ducts and anchored by means of two or more arms in the duct wall. The purpose of these arms is to shunt the weight and the pressure on the foundations on the one hand, the axial thrust of the turbine or the compressive forces of the water on the gate mechanism acting as a shut-off component in the closed state on the other hand, and lastly the moments acting on the generator-stator into the structure serving as the turbine foundation. These arms support the weight of the turbine, absorb the buoyancy arising when there is a flow of water (the turbine tends to float in the water because of the large water displacement), absorb the axial thrust for an operating turbine, absorb the compressive forces of the flowing water against the turbine (the pressure is particularly high when the deflecting blade system is closed and when the water pressure acts on the turbine housing), and, when the turbine is running, there is also a torque which must be absorbed by the arms. The torque of the turbine is shunted into the arms as if by cantilevers. These arms furthermore provide access into the turbine housing, required for maintenance. Transmission of the arm moments acting parallel to the duct wall is obtained either by these arms penetrating sufficiently into the concrete foundation as to shunt their loads into the concrete by surface pressure or by providing bearing plates at the ends of the arms which rest on or are mounted in the duct walls, the bearing plates being provided with dowel components.

In the first instance above, fixed-end moments will be inevitably introduced in addition to the forces already cited. These fixed end moments are those forces transmitted by the arms into the foundation for support. Where space is at a premium, this requires uneconomical expenditures for reinforcing the concrete and furthermore leads to serious difficulties in maintaining the access to the housing water-tight.

The present invention addresses the problem of creating a bearing for tubular turbines of horizontal or only slightly inclined axes, of which the supporting forces act both normally and parallel to the duct wall, the regulating or adjusting forces acting on the tubular turbine during the flow of the pressure medium not being transmitted to the foundation. These regulating or adjusting forces are the displacement forces which for water flow act on the turbine, i.e., when the water suddenly increases in pressure, the turbine is also lifted at the front end and a tipping load occurs. These displacement forces tend to lift the turbine out of its central position and also must be shunted by the arms. The foregoing shows that when such a turbine is mounted in a flow duct and which finally is connected only by an upper and a lower arm with the foundation, i.e., maintained in place, it is exposed to an entire set of force components all of which must be shunted into the foundation, or supported. This is achieved by the invention in that an anchoring designed as a knife-edge bearing provides the supporting force normal to the wall, while the component of the force parallel to the duct wall is transmitted through elastic members designed as thin plates. By taking such measures, one obtains the feasibility of the tubular turbine slightly moving in its lengthwise, axial direction, its inherent weight first being shunted through the knife-edge bearing into the foundation, although it may tilt about the knife-edge, while the elastic members prevent a shift in the axial direction.

The invention will be further illustrated by reference to the accompanying drawings, in which.

Figure 1:
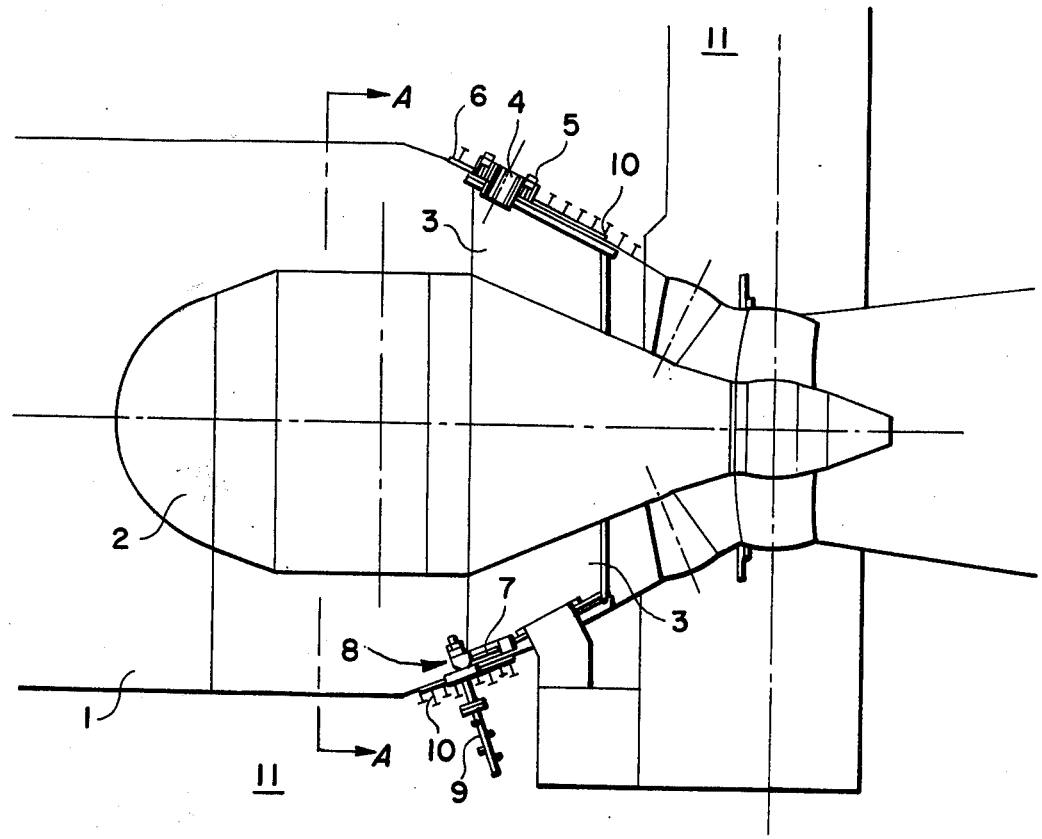
FIG. 1 is a longitudinal section through a tubular turbine and a bearing therefor.

FIG. 1 diagrammatically shows a tubular turbine such as is mounted into the foundation in the operational position. This tubular turbine is mounted in a horizontal position in the duct 1, the housing 2 being supported by two arms 3. The latter extend upwardly and downwardly from the housing 2, the residual flow cross-section being about two annulus halves. The connection to foundation 11 is so arranged at the upper end of the arm 3 that the latter terminates in a planar plate and faces an upper bearing plate 6. The plate 6 is rigidly connected to the foundation 11 through a plurality of dowels 10. A tubular part designed as an entry orifice 4 provides communication between these two pieces, i.e., the bearing plate 6 and the upper plate of the arm 3. A rubber support 5 is inserted between the part 4 and the plate 6, so as to allow a slight motion of the arm 3, i.e., of the turbine 2.

The bearing of the invention is mounted to the lower side of that arm 3 which points downwardly from the housing 2 of the tubular turbine. This bearing of the invention extends over the entire width of the arm 3 and is designed as a knife-edge bearing 8 resting in turn on a supporting plate 6. The axial hydraulic forces of the turbine are absorbed by the elastic members 7. The supporting plates 6 are solidly connected to the foundation by means of the tension rods 9.

Figure 2:
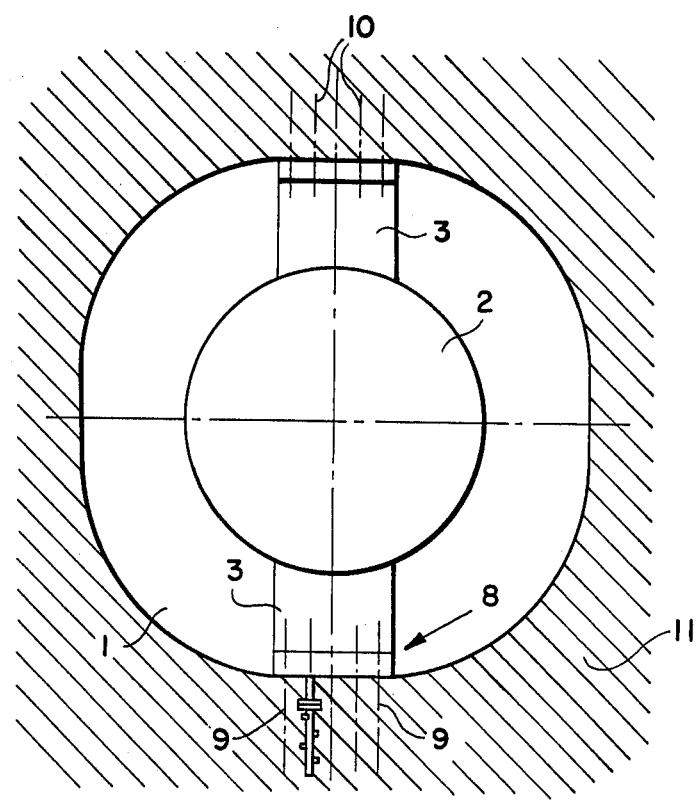
FIG. 2 is a cross-section relating to FIG. 1 taken on line A—A of FIG. 1.

FIG. 2 shows a cross-section of FIG. 1, the shape of the duct wall being visible. The housing 2 of the tubular turbine is indicated by a circle inside the duct 1. The arms 3 serving to support the tubular turbine point upwardly and downwardly. A horizontal line at the bottom indicates the knife-edge bearing 8. However, the figure is intended to show only that the knife-edge support 8 extends over the entire width of the lower arm 3. The wall of the duct 1 is limited by the foundation 11 which encloses the entire facility and which simultaneously is used as a water line. The upper arm 3 faces a support plate 6 which is fastened to the foundation 11 by means of the dowels 10. The tension rods 9, in lieu of dowels, are provided at the lower arm 3 for the purpose of fastening the latter.

Figure 3:
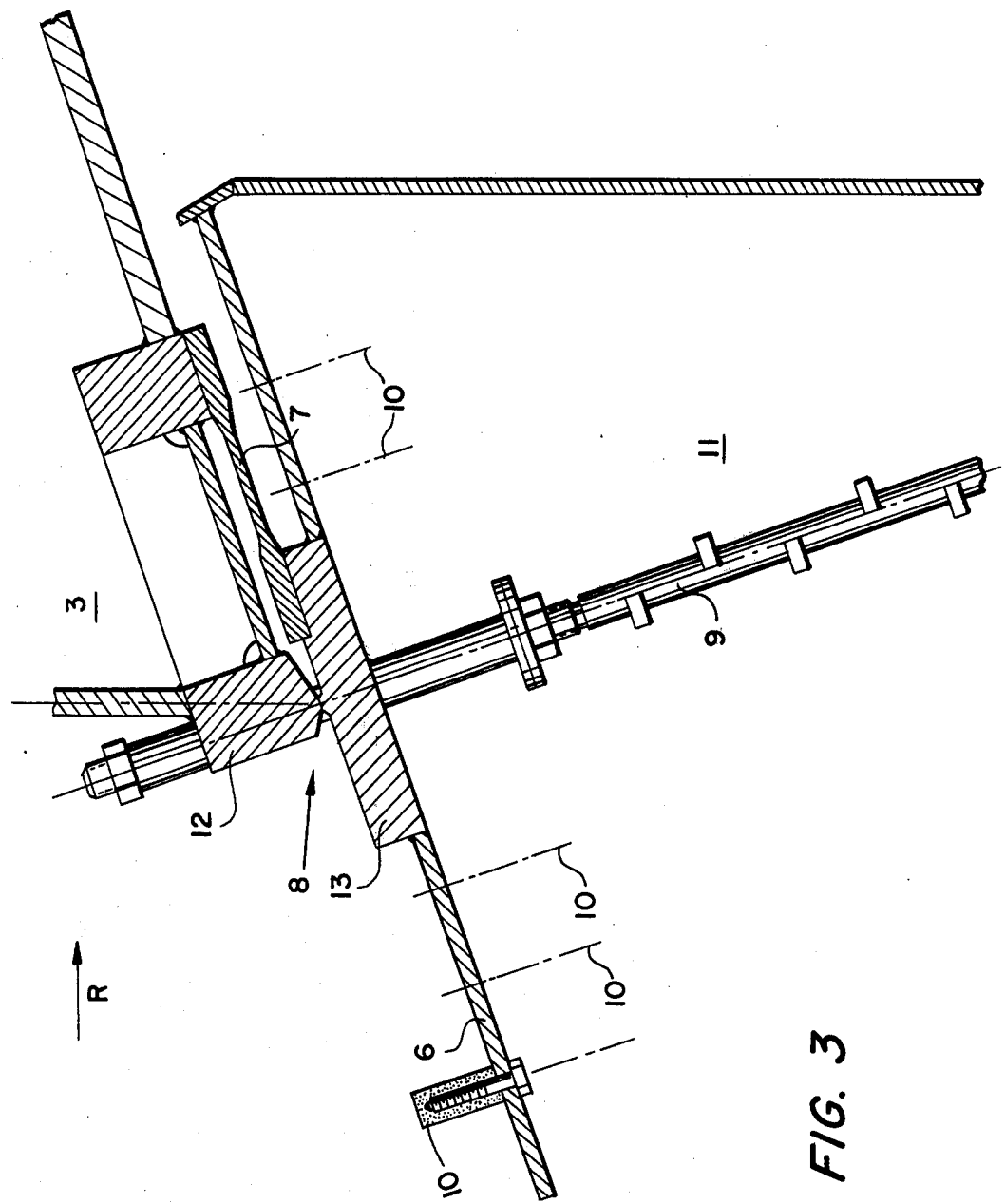
FIG. 3 is an enlarged representation of the knife-edge bearing.

FIG. 3 is a longitudinal section showing the design of the knife-edge bearing 8 of the invention. A knife 12 is mounted at the lower end of the arm 3, the knife extending over the entire width of the arm. Opposite the knife is a pan 13 which is also of the same width as the knife 12, but which represents a reinforced design of the supporting plate 6. The latter is solidly connected by the dowels 10 to the foundation 11. The inherent weight of the tubular turbine acts through the lower arm 3 on the knife-edge bearing 8 which transmits it to the foundation 11. As long as no water flows or other moments act on the tubular turbine, this type of bearing will suffice. If however flow-induced hydraulic forces act on the tubular turbine, it will tend to move in the direction of the arrow R. To prevent this, the additional elastic members 7 are provided. These consist of plates which are a kind of tension rod. These plates are solidly connected by means of screws or similar fasteners approximately at the center of the lower arm 3, while their other ends are connected to the upper part of the pan 13. With such an arrangement, the hydraulic forces acting in the direction of the arrow R may act on the tubular turbine without affecting its position in the knife-edge bearing 8. Thus, the entire tubular turbine may move slightly about the knife-edge bearing 8, for instance it may execute a minor pitching motion, without such forces being transmitted to the foundation. The pitching motion will not be hampered by the elastic members 7. Since the knife-edge bearing 8 also possibly allows some axial displacement in the direction of the arrow R, the elastic members 7 act as tension rods and prevent the tendency to such motion. There is also the further possibility of better shunting the forces into the foundation by means of the tension rods 9 for the purpose of additionally fastening the supporting plate 6 to the foundation 11. The tension rods 9 actually are no more than bolts penetrating deeply into the foundation. They are without further significance as regards the bearing.

Figure 4:
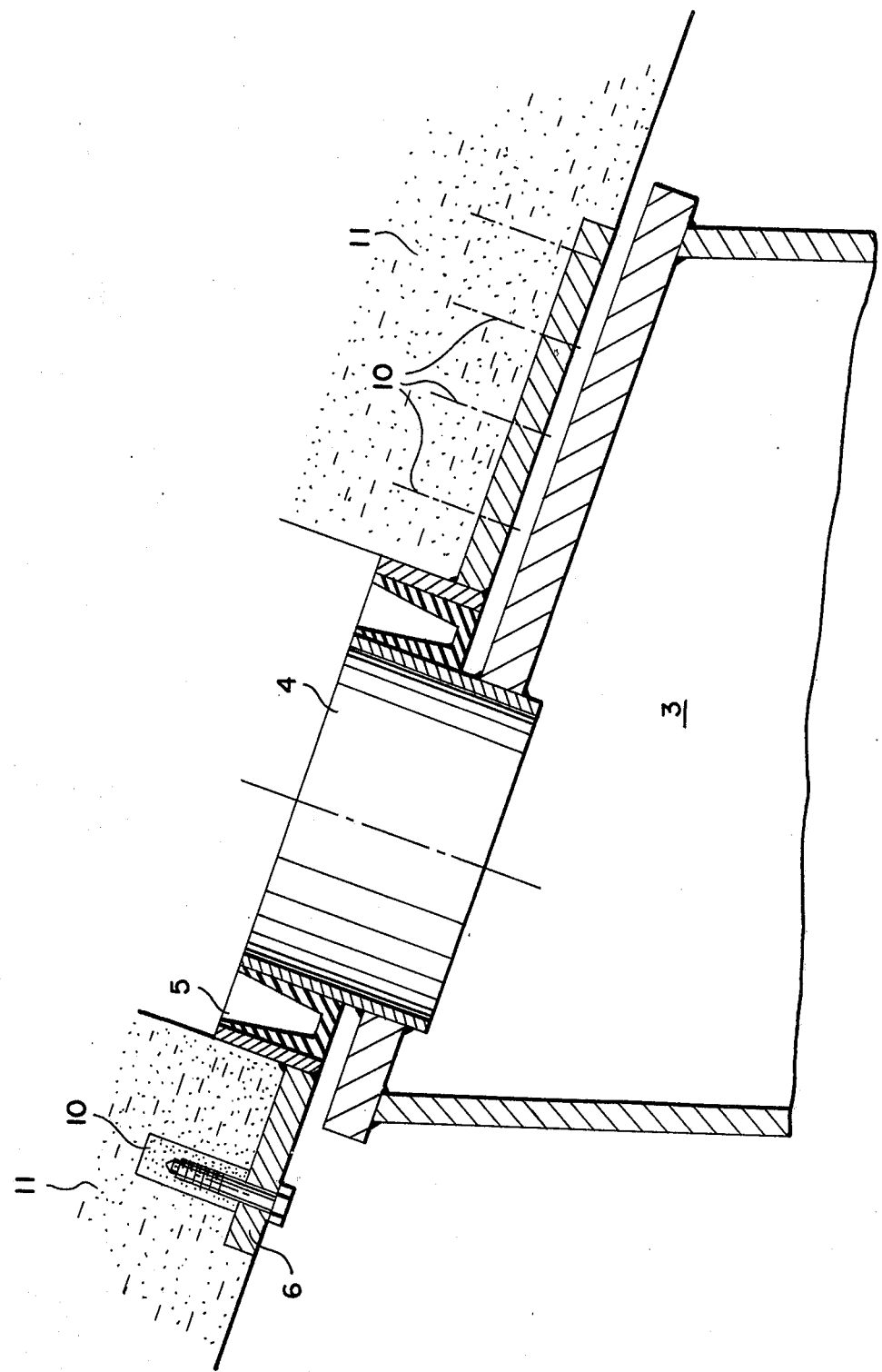
FIG. 4 is the support at the top of the turbine.

FIG. 4 shows the bearing design at the upper end of arm 3. A tube is welded into the cover plate of the arm 3, a still larger aperture being provided in the opposite supporting plate 6 in order to provide space for a rubber seal 5 acting as an intermediate component. Again the supporting plate 6 is solidly fastened to the foundation 11 by means of the dowels 10. If the tubular turbine is made to pitch by the axially-acting hydraulic forces, then these forces may be transferred at the upper side by means of the seal 5 to the supporting plate 6. The seal 5 is of such dimensions that it acts simultaneously as an entry for the tube 4 in order to reach the tubular turbine via the arm 3.

As already mentioned, this design of a bearing for a tubular turbine permits the effective absorption of any occurring pitching motions without additional forces being transmitted to the foundation. As is known, such bearings always involve the large problem of how to absorb such undesired forces. The free bearing of the invention no longer allows transmission of these forces to the foundation.

It will be obvious to those skilled in the art that many modifications may be made within the scope of the present invention without departing from the spirit thereof, and the invention includes all such modifications.

What is claimed is:

1. A mounting structure for a tubular turbine having a horizontal or slightly inclined machine axis, particularly a Kaplan-type tubular turbine, and whose supporting forces act at a right angle to the duct wall of said turbine, on one hand, and parallel to said duct wall, on the other hand, and are absorbed by supporting plates equipped with foundation anchors in said duct wall, comprising a knife-edge suspension means connected to said turbine housing and in engagement with one of said supporting plates, and adapted to lead that portion of said supporting forces acting at a right angle to said duct wall into a foundation, and elastic member means connected to said supporting plate and to a support for said suspension means, and adapted to absorb that portion of said supporting forces acting parallel to said duct wall.

2. A mounting structure according to claim 1 wherein the elastic member means is a thin plate which permits deformation by virtue of elasticity.

3. A mounting structure according to claim 1 including passage tube means connected to said turbine housing and to a supporting plate, whereby that portion of the supporting forces acting parallel to the duct wall is transmitted into the foundation.

4. A mounting structure according to claim 3 including a rubber suspension between said passage tube means and said supporting plate, said suspension serving as an elastic member and also as a seal.

5. A mounting structure according to claim 1 including tie rod means connected to said supporting plate.

* * * * *